US008407430B2

(12) United States Patent
Hayamatsu

(10) Patent No.: US 8,407,430 B2
(45) Date of Patent: Mar. 26, 2013

(54) ANALYSIS TECHNIQUE OF COMPUTER SYSTEM

(75) Inventor: Kenji Hayamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1522 days.

(21) Appl. No.: 11/052,775

(22) Filed: Feb. 9, 2005

(65) Prior Publication Data

US 2006/0175393 A1      Aug. 10, 2006

(30) Foreign Application Priority Data

Nov. 29, 2004 (JP) ................................. 2004-343579

(51) Int. Cl.
*G06F 12/00* (2006.01)
*G06F 13/00* (2006.01)
*G06F 13/28* (2006.01)
(52) U.S. Cl. ...................................................... 711/156
(58) Field of Classification Search .................... 711/156
See application file for complete search history.

(56) References Cited

U.S. PATENT DOCUMENTS

| | | | | |
|---|---|---|---|---|
| 6,021,401 | A * | 2/2000 | Oravetz et al. | 705/412 |
| 7,065,624 | B1 * | 6/2006 | Zahavi | 711/170 |
| 2002/0124137 | A1 * | 9/2002 | Ulrich et al. | 711/113 |
| 2003/0009401 | A1 * | 1/2003 | Ellis | 705/35 |
| 2003/0144002 | A1 * | 7/2003 | Chambers et al. | 455/450 |
| 2005/0071596 | A1 * | 3/2005 | Aschoff et al. | 711/170 |
| 2005/0143865 | A1 * | 6/2005 | Gardner | 700/291 |
| 2005/0228875 | A1 * | 10/2005 | Monitzer et al. | 709/221 |
| 2009/0113056 | A1 * | 4/2009 | Tameshige et al. | 709/226 |

FOREIGN PATENT DOCUMENTS

| | | |
|---|---|---|
| JP | 7-160650 A | 6/1995 |
| JP | 2000-172537 | 6/2000 |
| JP | 2003-223335 A | 8/2003 |
| JP | 2004-005288 | 1/2004 |

OTHER PUBLICATIONS

Chinese Office Action issued by the Chinese Intellectual Property Office on Mar. 27, 2009, in connection with corresponding Chinese Patent Application Serial No. 200510052511.9.
"Japanese Office Action", mailed by JPO and corresponding to Japanese application No. 2004-343579 on Mar. 15, 2011.

* cited by examiner

*Primary Examiner* — Sheng-Jen Tsai
(74) *Attorney, Agent, or Firm* — Fujitsu Patent Center

(57) ABSTRACT

This invention is to provide a technique to obtain data concerning a proper transaction amount. An information processing method to achieve the object comprises: obtaining data concerning a transaction amount presumed as being processed in a system to be analyzed for a plurality of business items; calculating a first load amount from the data concerning said transaction amount, obtaining data concerning operating state of the system to be analyzed, calculating a second load amount from the data concerning the operating state; and judging whether or not data that is a basis of the first load amount calculation is appropriate by determining whether or not the first load amount and the second load amount are satisfied with a predetermined condition.

15 Claims, 16 Drawing Sheets

| LOAD VALUE (B-max) | USAGE | CPU NAME | ASSUMED MODEL | NUMBER OF CPU(s) | MEMORY (GB) | DISK CAPACITY (GB) |
|---|---|---|---|---|---|---|
| 250 | DB/AP | SP64 0.5GHz | PRIMEP 400 | 1 | 6 | 59 |
| 400 | DB/AP | SP64 0.5GHz | PRIMEP 400 | 2 | 6 | 59 |
| | | | | | | |
| | | | | | | |
| 500 | DB/AP | SP64 1.0GHz | PRIMEP 400 | 1 | 6 | 59 |
| 900 | DB/AP | SP64 1.0GHz | PRIMEP 400 | 2 | 6 | 59 |
| | | | | | | |
| | | | | | | |

FIG.2

| BUSINESS CLASS | DATA CLASS | COEFFICIENT |
|---|---|---|
| SALES | SALES MANAGEMENT INVOICE | 0.1 |
| | | |
| PRODUCTION | PRODUCTION INSTRUCTION SHEET ETC. | 0.03 |
| | NO. OF ITEMS PLANNED IN MRP ETC. | 0.02 |
| | | |
| FINANCIAL ACCOUNTING | FINANCIAL ACCOUNTING INVOICE | 0.3 |
| | | |
| MANAGEMENT ACCOUNTING | MANAGEMENT ACCOUNTING INVOICE | 0.2 |
| | | |
| | | |
| | | |

FIG.3

| BUSINESS CLASS | DATA CLASS | TIME ZONE | TIME COEFFICIENT |
|---|---|---|---|
| SALES | SALES MANAGEMENT INVOICE | 9-12 | 1.1 |
| | | 12-18 | 1 |
| PRODUCTION | PRODUCTION INSTRUCTION SHEET ETC. | 9-12 | 1.4 |
| | NO. OF ITEMS PLANNED IN MRP ETC. | 12-18 | 1.9 |
| | | | |
| FINANCIAL ACCOUNTING | FINANCIAL ACCOUNTING INVOICE | 18-09 | 1.2 |
| | | | |
| MANAGEMENT ACCOUNTING | MANAGEMENT ACCOUNTING INVOICE | 18-09 | 1.3 |
| | | | |
| | | | |
| | | | |

FIG.4

| BUSINESS CLASS | DATA CLASS | CONVERSION COEFFICIENT TO PKG1 | CONVERSION COEFFICIENT TO PKG2 |
|---|---|---|---|
| SALES | SALES MANAGEMENT INVOICE | 1.1 | 1 |
| PRODUCTION | PRODUCTION INSTRUCTION SHEET ETC. | 0.7 | 0.6 |
| | NO. OF ITEMS PLANNED IN MRP ETC. | 0.9 | 0.9 |
| FINANCIAL ACCOUNTING | FINANCIAL ACCOUNTING INVOICE | 1.3 | 1.3 |
| MANAGEMENT ACCOUNTING | MANAGEMENT ACCOUNTING INVOICE | 1.4 | 1.5 |
| | | | |
| | | | |

FIG.5

| 1 SIZING BASIC INFORMATION INPUT | | | | | |
|---|---|---|---|---|---|
| UPDATE OF BASIC VALUE INPUT ENTRY | | | | | ☐ CHECK |
| BUSINESS CLASS | DATA CLASS | NO. OF PROCESSED CASES | TIME ZONE | | |
| SALES | SALES MANAGEMENT INVOICE | 100 | 8-9 | | |
| FINANCIAL ACCOUNTING | FINANCIAL ACCOUNTING INVOICE | 500 | 18-19 | | |

CALCULATION AND DISPLAY OF PKG LOAD VALUE A
PKG VALUE A →  ☐

| BUSINESS CLASS | DATA CLASS | NO. OF PROCESSED CASES FOR EACH DAY AT HIGH LOAD | TIME ZONE TO HAVE TO COMPLETE PROCESSING AT HIGH LOAD | ... | |
|---|---|---|---|---|---|
| SALES | SALES MANAGEMENT INVOICE | 100 | 8-9 | ... | |
| PRODUCTION | PRODUCTION INSTRUCTION SHEET ETC. | 2000 | 9-10 | | |
| | NO. OF ITEMS PLANNED IN MRP ETC. | 10000 | 10-12 | | |
| FINANCIAL ACCOUNTING | FINANCIAL ACCOUNTING INVOICE | 500 | 18-19 | | |
| MANAGEMENT ACCOUNTING | MANAGEMENT ACCOUNTING INVOICE | 1300 | 19-20 | | |
| | | | | | |

FIG.9

| BUSINESS CLASS | DATA CLASS | NO. OF PROCESSED CASES FOR EACH DAY AT HIGH LOAD | COEFFICIENT 1 | INTERMEDIATE VALUE 1 | TIME ZONE TO HAVE TO COMPLETE PROCESSING AT HIGH LOAD | TIME COEFFICIENT 1 | INTERMEDIATE VALUE 2 |
|---|---|---|---|---|---|---|---|
| SALES | SALES MANAGEMENT INVOICE | 100 | 0.1 | 10 | 8-9 | 1.1 | 11 |
| | | | | | | | 0 |
| | | | | | | | 0 |
| PRODUCTION | PRODUCTION INSTRUCTION SHEET ETC. | 2000 | 0.03 | 60 | 9-10 | 1.4 | 84 |
| | NO. OF ITEMS PLANNED IN MRP ETC. | 10000 | 0.02 | 200 | 10-12 | 1.9 | 380 |
| | | | | | | | 0 |
| FINANCIAL ACCOUNTING | FINANCIAL ACCOUNTING INVOICE | 500 | 0.3 | 150 | 18-19 | 1.2 | 180 |
| | | | | | | | 0 |
| | | | | | | | 0 |
| MANAGEMENT ACCOUNTING | MANAGEMENT ACCOUNTING INVOICE | 1300 | 0.2 | 260 | 19-20 | 1.3 | 338 |
| | | | | | | | 0 |
| | | | | | | | 0 |
| | | | | | | TOTAL | 993 |

FIG.10

3 SIZING MODIFICATION SUPPORT FUNCTION>

| BUSINESS CLASS | DATA CLASS | NO. OF PROCESSED CASES | TIME ZONE | | |
|---|---|---|---|---|---|
| SALES | SALES MANAGEMENT INVOICE | 100 | 8-10 | | |
| FINANCIAL ACCOUNTING | FINANCIAL ACCOUNTING INVOICE | 500 | 18-19 | | |

PKG LOAD VALUE A →  [        ]

PKG LOAD VALUE B →  [        ]

MODIFIED PROPOSAL VALUE →
- SALES MANAGEMENT INVOICE [ 120 ] CANDIDATE 1
- DATA CLASS 2 [       ] CANDIDATE 2
- DATA CLASS 3 [       ] CANDIDATE 3

TRIAL CALCULATION TO SHIFT TO DIFFERENT PKG

SELECTION OF PKG ASSUMED AS SHIFT DESTINATION → [ ▼ ] * PULL-DOWN CAN BE USED

PROPOSAL VALUE WHEN SHIFTING TO PKG1 →
- SALES MANAGEMENT INVOICE [ 180 ]
- DATA CLASS 2 [       ]
- DATA CLASS 3 [       ]

PROPOSAL VALUE WHEN SHIFTING TO PKG2 →
- SALES MANAGEMENT INVOICE [ 90 ]
- DATA CLASS 2 [       ]
- DATA CLASS 3 [       ]

FIG.14

| 4  INPUT OF ASSUMED SIZING BASIC INFORMATION IN FUTURE | | | | | |
|---|---|---|---|---|---|
| UPDATE OF BASIC VALUE INPUT ENTRY | | | | | ☐ CHECK |
| BUSINESS CLASS | DATA CLASS | NO. OF PROCESSED CASES | ASSUMED VALUE IN FUTURE | TIME ZONE | |
| SALES | SALES MANAGEMENT INVOICE | 100 | 200 | 8-10 | |
| FINANCIAL ACCOUNTING | FINANCIAL ACCOUNTING INVOICE | 500 | 800 | 18-19 | |

CALCULATION AND DISPLAY OF PKG LOAD VALUE A
PKG LOAD VALUE A → [     ]

| BUSINESS CLASS | DATA CLASS | NO. OF PROCESSED CASES FOR EACH DAY AT HIGH LOAD | ASSUMED VALUE IN FUTURE | TIME ZONE TO HAVE TO COMPLETE PROCESSING AT HIGH LOAD | ... |
|---|---|---|---|---|---|
| SALES | SALES MANAGEMENT INVOICE | 100 | 200 | 8-10 | |
| PRODUCTION | PRODUCTION INSTRUCTION SHEET ETC. | 2000 | | 9-10 | |
| | NO. OF ITEMS PLANNED IN MRP ETC. | 10000 | | 10-12 | |
| FINANCIAL ACCOUNTING | FINANCIAL ACCOUNTING INVOICE | 500 | 800 | 18-19 | |
| MANAGEMENT ACCOUNTING | MANAGEMENT ACCOUNTING INVOICE | 1300 | | 19-20 | |
| | | | | | |
| | | | | | |

FIG.17

| BUSINESS CLASS | DATA CLASS | NO. OF PROCESSED CASES FOR EACH DAY AT HIGH LOAD | ASSUMED VALUE IN FUTURE | COEFFICIENT 1 | INTERMEDIATE VALUE 1 | TIME ZONE TO HAVE TO COMPLETE PROCESSING AT HIGH LOAD | TIME COEFFICIENT 1 | INTERMEDIATE VALUE 2 |
|---|---|---|---|---|---|---|---|---|
| SALES | SALES MANAGEMENT INVOICE | 100 | 200 | 0.1 | 20 | 8-10 | 1.1 | 22 |
| | | | | | | | | 0 |
| | | | | | | | | 0 |
| PRODUCTION | PRODUCTION INSTRUCTION SHEET ETC. | 2000 | | 0.03 | 60 | 9-10 | 1.4 | 84 |
| | NO. OF ITEMS PLANNED IN MRP ETC. | 10000 | | 0.02 | 200 | 10-12 | 1.9 | 380 |
| | | | | | | | | 0 |
| FINANCIAL ACCOUNTING | FINANCIAL ACCOUNTING INVOICE | 500 | 800 | 0.3 | 240 | 18-19 | 1.2 | 288 |
| | | | | | | | | 0 |
| | | | | | | | | 0 |
| MANAGEMENT ACCOUNTING | MANAGEMENT ACCOUNTING INVOICE | 1300 | | 0.2 | 260 | 19-20 | 1.3 | 338 |
| | | | | | | | | 0 |
| | | | | | | | | 0 |
| | | | | | | | LOAD VALUE C | 1112 |

FIG.20

4 RECOMMENDATION CONFIGURATION DISPLAY

| BUSINESS CLASS | DATA CLASS | NO. OF PROCESSED CASES | ASSUMED VALUE IN FUTURE | TIME ZONE |
|---|---|---|---|---|
| SALES | SALES MANAGEMENT INVOICE | 100 | 200 | 9-10 |
| FINANCIAL ACCOUNTING | FINANCIAL ACCOUNTING INVOICE | 500 | 800 | 18-19 |

PKG LOAD VALUE A → ☐   • INCREASE AND DECREASE RATIO OF TRANSACTION AMOUNT ☐

PROPOSAL VALUE FOR FUTURE →
SALES MANAGEMENT INVOICE: 120 (CANDIDATE 1)
DATA CLASS 2 (CANDIDATE 2)   DATA CLASS 3 (CANDIDATE 3)

FUTURE LOAD VALUE C → ☐

RECOMMENDED CONFIGURATION

| USAGE | CPU NAME | ASSUMED MODEL | NO. OF CPU(s) | MEMORY (GB) | DISK(GB) |
|---|---|---|---|---|---|
| DB/AP | SP64 1.0GHz | PRIMEP | 2 | 6 | 59 |

FIG.21

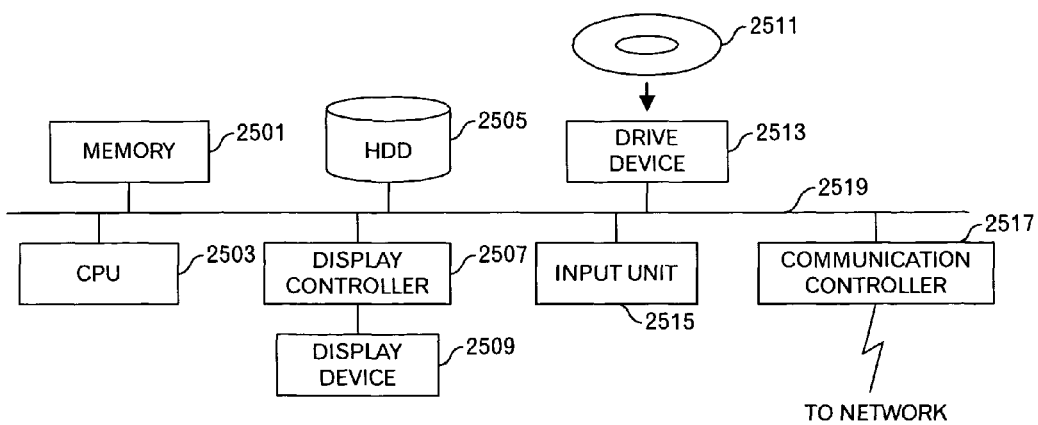

FIG.22

ANALYSIS TECHNIQUE OF COMPUTER SYSTEM

TECHNICAL FIELD OF THE INVENTION

This invention relates to an analysis technique of a computer system.

BACKGROUND OF THE INVENTION

In a system of a customer who is operating the backbone system application including the Enterprise Resource Planning (ERP) as a main application, it becomes an important problem to secure an appropriate computer resource according to the operating state, when plural applications are integrated for each business purpose and operated as one system. As for the customer who newly introduces the ERP, in order to fix the range of the business, and fix the appropriate machine performance based on the transaction amount of the customer, necessary machine resources (CPU, memory, disk capacity, and the like) are determined by using factors of the transaction amount as an input, and as a result, an appropriate hardware is selected. Moreover, as for the existing in-service customer, it is necessary to observe the operating state (resource usage status) of the machine at an appropriate timing, and carry out the appropriate reinforcement of the hard resource based on the assumed necessary transaction amount, the replacement of the hardware, or the like.

For instance, JP-A-2000-172537 discloses a technique to enable not only to accurately predict the performance of the system, but also to obtain the same performance evaluation result by anyone without relying on neither developer's experience nor intuition. Specifically, a performance index computing unit is provided to compute a predetermined performance index value from at least a part of data in data of various conditions concerning performance evaluation models input from each condition input unit, and it computes a predetermined performance index value from the input condition data and carries out the performance prediction using not only the input data but also the computation result. Accordingly, it is different from inputting the performance index value based on the developer's prediction, and there is no room for entering the developer's experience, intuition and the like. Therefore, it becomes possible for anyone to represent the system performance by a very objective numerical value.

In the aforementioned background art, although various condition data concerning the performance evaluation model is input, and the correct data can basically be obtained when the accurate data is input, there is no consideration for how the performance prediction should be carried out when the accurate data cannot be input.

That is, although data concerning the transaction amount is investigated at the system introduction or system replacement, the accurate data cannot always be collected for various reasons. Therefore, an accurate evaluation cannot often be carried out. Moreover, although there is a technique to confirm the resource usage amount and the load status from the operating state, it is difficult to quantitatively reflect the impact by the increase and decrease of the transaction amount that man think about amount in the hardware configuration.

SUMMARY OF THE INVENTION

Therefore, an object of this invention is to provide a technique to obtain data concerning a proper transaction amount.

Furthermore, another object of this invention is to provide a technique to quantitatively reflect the impact by the increase and decrease of the transaction amount in the hardware configuration.

An information processing method according to a first aspect of the invention comprises: obtaining data concerning a transaction amount presumed as being processed in a system to be analyzed for a plurality of business items, and storing the data into a transaction amount data storage; calculating a first load amount from data stored in the transaction amount data storage, and storing it into a first load amount storage; obtaining data concerning operating state of the system to be analyzed, and storing it into an operating state data storage; calculating a second load amount from data stored in the operating state, and storing it into a second load amount storage; and judging whether or not data that is a basis of the first load amount calculation and is stored in the transaction amount data storage is appropriate by determining whether or not the first load amount stored in the first load amount storage and the second load amount stored in the second load amount storage are satisfied with a predetermined condition.

As a result, because it is possible to determine the adequacy of the data concerning the transaction amount by using both of the data concerning the transaction amount obtained by the research or the like from the customer, for example, and the data representing the operating state actually obtained from the system to be analyzed, it is possible to determine whether or not the transaction amount close to more actual state is grasped.

Moreover, the information processing method according to the first aspect of the invention may further comprise, if the first and second load amounts are not satisfied with the predetermined condition in the judging, prompting a user to modify the data concerning the transaction amount, and storing the data modified by the user into the transaction amount data storage; and executing the calculating the first load amount and the judging. By repeating such processing, it is possible to obtain the data concerning the transaction amount close to more actual state.

Furthermore, the information processing method according to the first aspect of the invention may further comprise: if the first and second load amounts are satisfied with the predetermined condition at the judging, prompting the user to input data concerning a future transaction amount for at least a part of the plural business items, and storing it into the transaction amount data storage; and calculating a first load amount in future by using said data concerning the future transaction amount, which is stored in the transaction data storage. As a result, because that the first and second load amounts are satisfied with the predetermined condition means that the data concerning the transaction amount is appropriate, it becomes possible to consider the future transaction amount based on the appropriate data, and calculate an appropriate load amount.

In addition, the information processing method according to the first aspect of the invention may further comprise referring to a correspondence table to associate a load amount with a computer configuration, and specifying a computer configuration from the first load amount in future, which is stored in the storage to present the computer configuration to the user. As a result, the impact by the increase and decrease of the transaction amount can be quantitatively reflected to specify the computer configuration.

Furthermore, the information processing method according to the first aspect of the invention may further comprise, if the first and second load amounts are not satisfied with the predetermined condition in the judging, specifying a business item to be modified by using the data stored in the operating state data storage. When it is not understood which business item should be modified even in a case where the modification is carried out, improper modification may be carried out. Therefore, it is very useful if it is possible to specify the business item to be modified according to the actual state of the system to be analyzed.

An information processing method according to a second aspect of the invention comprises: obtaining a first load amount calculated based on data concerning a transaction amount presumed to be processed in a system to be analyzed, and storing it into a first load amount storage; obtaining data representing operating state of the system to be analyzed, and storing it into an operating state data storage; calculating a second load amount from data stored in the operating state data storage, and storing it into a second load amount data storage; and judging whether or not data that is a basis of the calculation of the first load amount is appropriate by judging whether or not the first load amount stored in the first load amount storage and the second load amount stored in the second load amount storage are satisfied with a predetermined condition. Thus, the first load amount may be obtained, separately.

A program causing a computer to execute the information processing method according to this invention can be created, and the program is stored in a storage medium or storage device, such as a flexible disk, CD-ROM, magneto-optical disk, semiconductor memory, or hard disk. In addition, it may be distributed as digital signals via a network. Incidentally, intermediate data during processing is temporarily stored in a storage device such as a memory in a computer.

BRIEF DESCRIPTION OF THE DRAWINGS

FIG. 2 is a diagram showing an example of a conversion table;

FIG. 3 is a diagram showing an example of a first coefficient table;

FIG. 4 is a diagram showing an example of a second coefficient table;

FIG. 5 is a diagram showing an example of a replacement conversion table;

FIG. 9 is a diagram showing an example of data stored in a transaction amount data storage;

FIG. 10 is a diagram showing an example to calculate the load value A;

FIG. 14 is a diagram showing an example of a screen to modify the transaction amount;

FIG. 17 is a diagram showing an example of data stored in the transaction amount data storage;

FIG. 20 is a diagram showing an example of calculating the load value C in future;

FIG. 21 is a diagram showing an example of a screen to display a recommendation configuration; and FIG. 22 is a functional block diagram of a computer system.

DETAILED DESCRIPTION OF THE PREFERRED EMBODIMENTS

Figure 1:
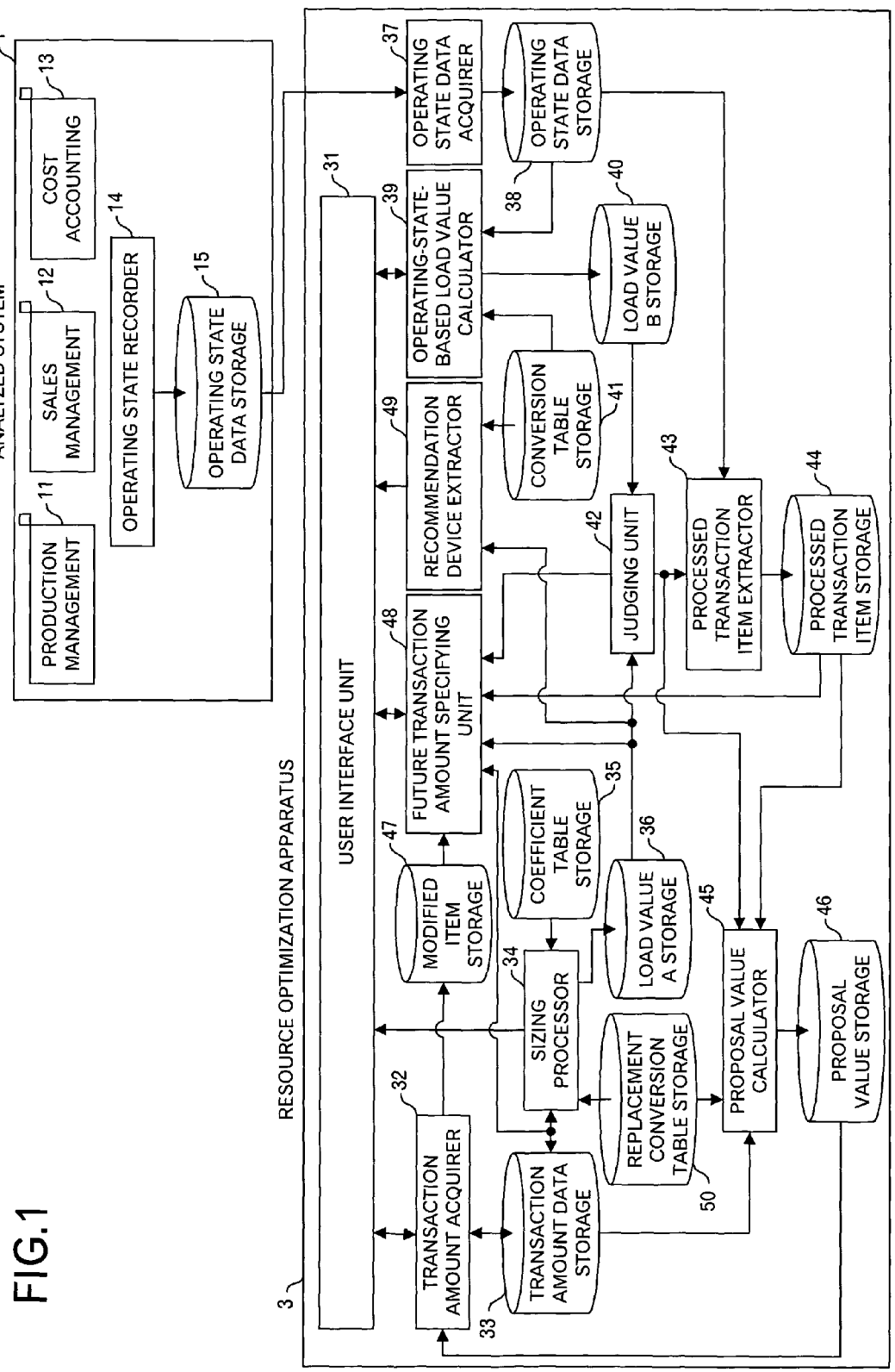
FIG. 1 is a functional block diagram of an embodiment in the invention.

FIG. 1 shows a functional block diagram used in one embodiment of this invention. An analyzed system 1 in this embodiment is connected with a resource optimization apparatus 3 through a network. The analyzed system 1 is a system in which a production management application 11, a sales management application 12, a cost accounting application 13, and the like are executed. Moreover, the analyzed system 1 has an operating state recorder 14 and an operating state data storage 15 for a processing by the resource optimization apparatus 3. For instance, the operating state recorder 14 collects data that represents a usage rate of the CPU, a usage rate of the memory, a usage rate of the hard disk, and other actual execution status, and stores it into the operating state data storage 15.

The resource optimization apparatus 3 has a user interface unit 31, a transaction amount acquirer 32, a transaction amount data storage 33, a sizing processor 34, a coefficient table storage 35, a load value A storage 36, an operating state data acquirer 37, an operating state data storage 38, an operating-state-based load value calculator 39, a load value B storage 40, a conversion table storage 41, a judging unit 42, a processed transaction item extractor 43, a processed transaction item storage 44, a proposal value calculator 45, a proposal value storage 46, a modified item storage 47, a future transaction amount specifying unit 48, a recommendation device extractor 49, and a replacement conversion table storage 50.

The operating state data acquirer 37 acquires execution status data from the operating state data storage 15 in the analyzed system 1 through the network, and stores it into the operating state data storage 38. The operating-state-based load value calculator 39 inputs and outputs data from and to a user through the user interface unit 31, refers to the load value B storage 40 to calculate a load value B by using the data stored in the operating state data storage 38, and stores it into the load value B storage 40. The transaction amount acquirer 32 acquires data concerning the transaction amount from the user through the user interface unit 31, and stores it into the transaction amount data storage 33. The sizing processor 34 calculates a load value A by referring to the transaction amount data storage 33 and the coefficient table storage 35, and stores it into the load value A storage 36. Moreover, it outputs data to the user through the user interface unit 31. Furthermore, it may calculate the load value A according to circumstances by referring to the replacement conversion table storage 50.

The judging unit 42 carries out the judgment by referring to the load value B storage 40 and the load value A storage 36, and outputs instructions to the proposal value calculator 45 and the processed transaction item extractor 43 when it is judged that load value A and the load value B are satisfied with a predetermined condition. The processed transaction item extractor 43 carries out a processing by referring to the operating state data storage 38 in response to the instruction from the judging unit 42, and stores the processing result into the processed transaction item storage 44. Moreover, the proposal value calculator 45 carries out a processing by referring to the processed transaction item storage 44, the transaction amount data storage 33, and the replacement conversion table storage 50 in response to the instruction from the judging unit 42, and stores a proposal value into the proposal value storage 46 so as to correspond to the processed transaction item stored in the processed transaction item storage 44. In this case, the transaction amount acquirer 32 prompts the user to carry out the modification by using the data stored in the transaction amount data storage 33 and the proposal value storage 46 through the user interface unit 31. When the modified data is input through the user interface unit 31, the transaction amount acquirer 32 stores the modified data into the transaction amount data storage 33. Then, the sizing processor 34 calculates a load value A again, and stores it into the load value A storage 36. Furthermore, the judging unit 42 carries out the judgment processing, again. Moreover, the transaction amount acquirer 32 stores the modified value of the business item into the modified item storage 47.

Moreover, in a case where the judging unit 42 judges that load value A and the load value B are satisfied with the predetermined condition, the future transaction amount specifying unit 48 prompts the user to input data concerning the transaction amount in future through the user interface unit 31 in response to the instruction from the judging unit 42, and accepts input data from the user via the user interface unit 31, and stores it into the transaction amount data storage 33. Incidentally, in this case, it may calculate the proposal value of the transaction amount in future for the user by referring to the modified item storage 47, the transaction amount data storage 33, and the processed transaction item storage 44, and present the proposal value through the user interface unit 31. When data concerning the transaction amount in future is stored in the transaction amount data storage 33, the sizing processor 34 calculates a future load value C by using the data concerning the transaction amount in future, and stores it into the load value A storage 36. The recommendation device extractor 49 specifies a recommended system configuration in future by referring to the load value A storage 36 and the conversion table storage 41, and presents it to the user via the user interface unit 31.

Next, FIG. 2 shows an example of data stored in the conversion table storage 41. In the example of FIG. 2, a load value (B-max) and a usage (DB server, AP server, or the like), a CPU name, an assumed model name, the number of CPUs, a memory size (GB), and disk capacity (GB) are correspondingly registered. That is, in a case where the usage is "the DB server" or "the AP server", and the load value is 250, a system configuration whose CPU is SP64/0.5 GHz, assumed model is PRIMEP400, memory is 6 GB, number of CPUs is 1, and disk capacity is 59 GB is recommended. On the other hand, in a case where the usage is "the DB server" or "the AP server", as for the system configuration, CPU is SP64/0.5 GHz, assumed model is PRIMEP400, the memory is 6 GB, the number of CPUs is 1, and the disk capacity is 59 GB, the load value becomes 250.

Moreover, an example of data stored in the coefficient table storage 35 is shown in FIG. 3 and FIG. 4. In FIG. 3, an example of the first coefficient table that sizing processor 34 uses is shown, and a business class, a data class, and a coefficient are registered. That is, the coefficient has been determined for each business class and each data class. Moreover, in FIG. 4, an example of the second coefficient table that the sizing processor 34 uses is shown, and a business class, a data class, a time zone, and a time coefficient are registered. That is, the coefficient has been determined for each business class, each data class, and each time zone.

Furthermore, an example of data stored in the replacement conversion table storage 50 is shown in FIG. 5. In the example of FIG. 5, a business class, a data class, a conversion coefficient to a business package PKG1, and a conversion coefficient to a business package PKG2 are registered. That is, for each business class and each data class, the conversion coefficient to the business package PKG1 and the conversion coefficient to the business package PKG2 have been determined. There is no limitation that relates to the business package of the shift destination in this embodiment.

Next, a processing flow of the system shown in FIG. 1 will be explained by using FIGS. 6 to 20. First of all, the user interface unit 31 displays a screen as shown in FIG. 7 on the display device of the resource optimization apparatus 3, for instance. In the example of FIG. 7, the screen includes information of a host to be analyzed and a main menu as an initial screen. In the main menu, processings to be carried out in turn are enumerated as follows: 1. sizing basic information input, 2. operating state display, 3. sizing modification support function, and 4. recommended configuration display. "1. sizing basic information input" includes update of the basic value input entry and calculation and display of PKG (package) load value A. "2. operating state display" includes a display function of performance information (including CPU usage rate, memory usage rate, disk I/O, and the like) including setting of performance information collection and calculation and display of PKG load value B. Incidentally, although the detailed explanation is omitted because settings for the performance information collection are not main parts of this embodiment, either or everything of the performance information is designated, for example. "3. sizing modification support function" includes a function of the modification input value proposal. "4. recommendation configuration display" includes an input of the assumed sizing basic information in future and a recommendation configuration display.

Figure 6:
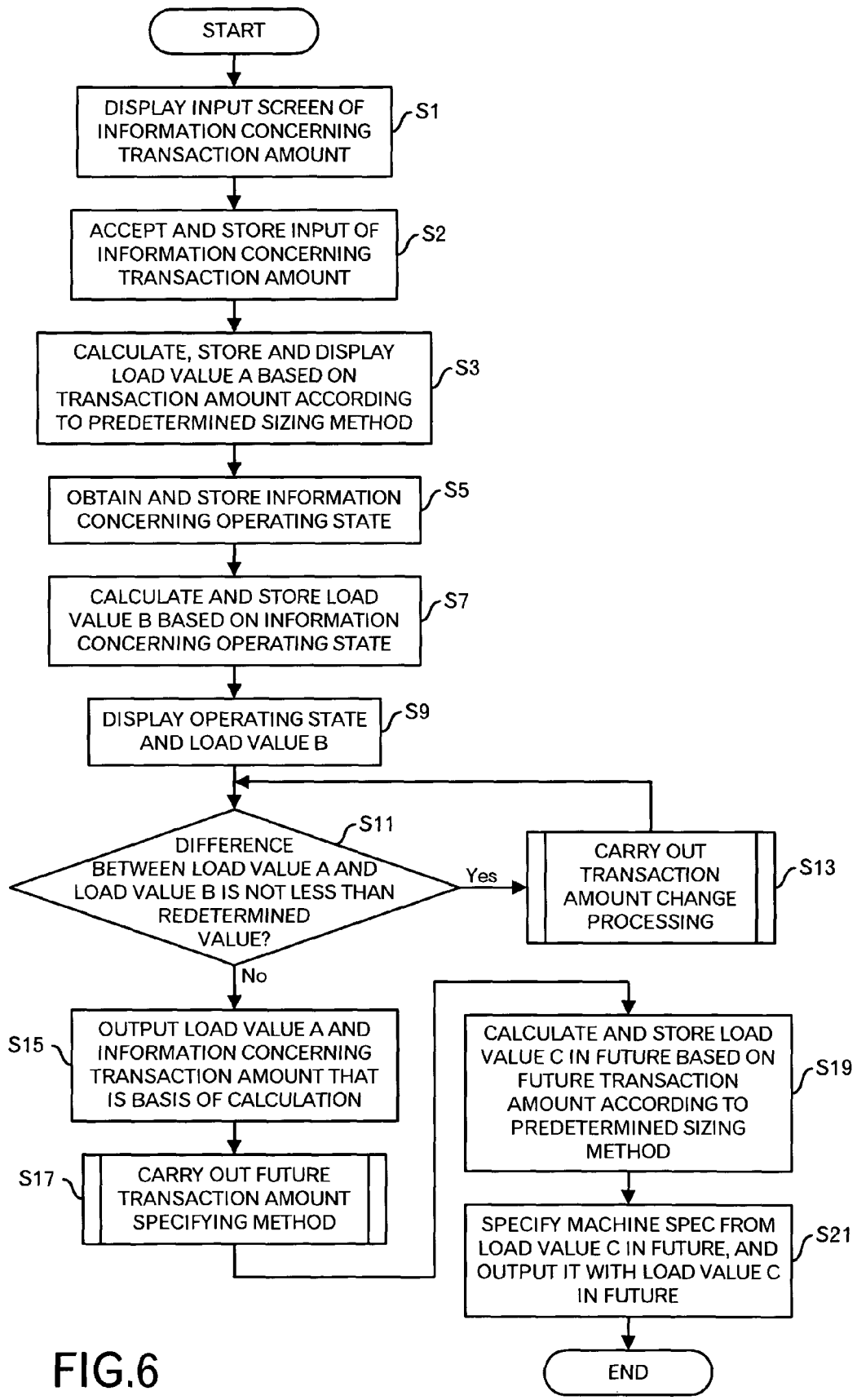
FIG. 6 is a diagram showing a main processing flow in the embodiment of the invention.
Figures 7, 8:
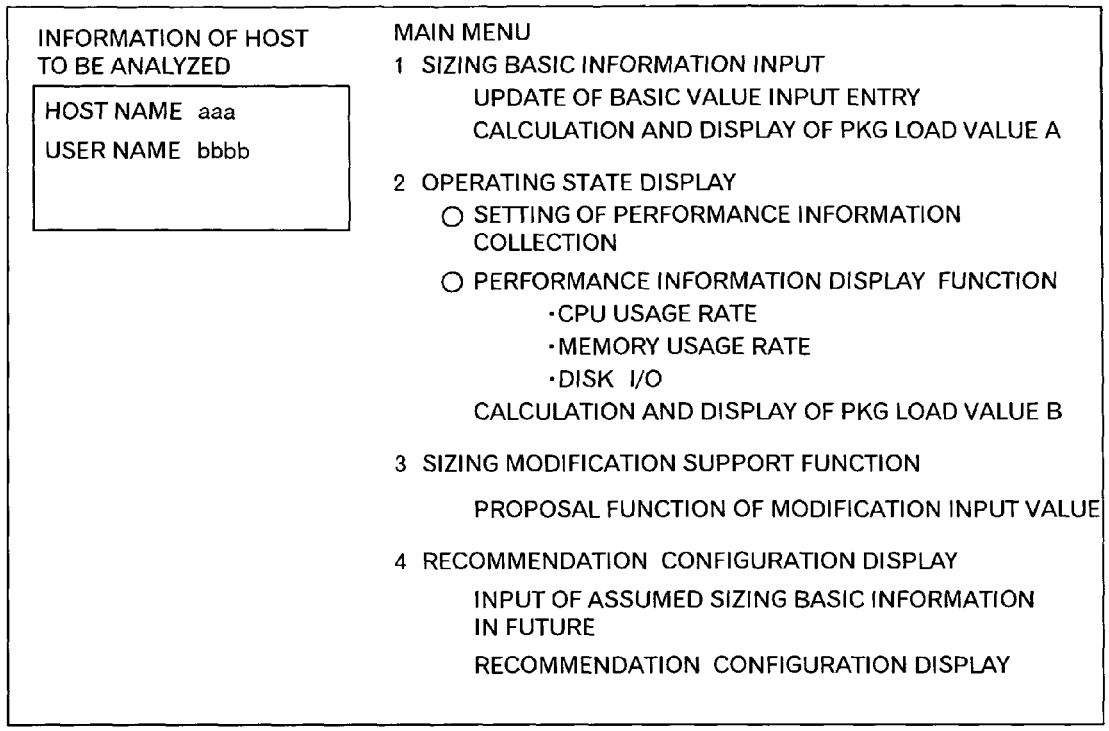
FIG. 7 is a diagram showing a screen example of the main menu.
FIG. 8 is a diagram showing an input screen example of the information concerning the transaction amount.

Then, when shifting to "1. sizing basic information input", the transaction amount acquirer 32 displays an input screen of information concerning the transaction amount on the display device via the user interface unit 31 (FIG. 6: step S1). For instance, a display as shown in FIG. 8 is carried out. The screen example of FIG. 8 includes a column to update the basic value input entry and calculation and display part of the PKG load value A. In the column to update the basic value input entry, business items to be input (combination of the business class and the data class) are enumerated, and data input is prompted into a column of the number of processed cases for each day at high load and a column of a time zone to have to complete the processing at high load. Incidentally, the information concerning the transaction amount includes data such as the number of financial accounting invoices during one year, the number of sales management invoices during one year, the number of invoices for each day at the busiest season, and the time zone (or time) to have to complete the processing at high load. A check button is a button to cause the system to confirm whether data entry for all the business items was completed, and calculate the load value A. In the calculation and display part of the PKG load value A, the calculated load value A is displayed. Incidentally, it is also possible to designate the business package of the shift destination at this stage when a shift to a different business package is carried out.

When the screen like FIG. 8 is displayed, the user inputs information concerning the transaction amount for each business item. On the other hand, the user interface unit 31 accepts the input of the information concerning the transaction amount by the user, outputs the received information to the transaction amount acquirer 32, and the transaction amount acquirer 32 stores the received information into the transaction amount data storage 33 (step S2). Incidentally, it is also possible that the data stored in the transaction amount data storage 33 in advance is read to display it in the column to update the basic value input entry in FIG. 8, and the user carries out the confirmation and modification. For instance, the data as shown in FIG. 9 is stored in the transaction amount data storage 33. In the example of FIG. 9, input data such as the business class, the data class, the number of processed cases for each day at high load, and the time zone to have to complete the processing at high load is registered.

Then, the sizing processor 34 calculates the load value A according to a predetermined sizing method based on the information concerning the transaction amount by referring to the coefficient table storage 35 and the transaction amount data storage 33, stores it into the load value A storage 36, and displays it on the display device via the user interface unit 31 (step S3). Incidentally, in a case where the shift to a different business package is carried out, the conversion processing described later is carried out by referring to the replacement conversion table storage 50. In the screen example of FIG. 8, the calculation result is displayed in the calculation and display part of the PKG load value A. Although various methods are known as for the sizing method, it is also possible to use any method. In the step S3, calculation as shown in FIG. 10 is carried out, for instance. That is, the value of the corresponding coefficient stored in the coefficient table storage 35 is multiplied by the number of processed cases for each day at high load for each business class and each data class to calculate an intermediate value 1. Furthermore, a time coefficient 1 corresponding to the time zone to have to complete processing at high load for each business class and each data class is multiplied by the intermediate value 1 to calculate an intermediate value 2. The total value of the intermediate values 2 becomes the load value A in this embodiment. Incidentally, such a technique is a mere example, and it is not limited to this technique.

Figure 11:
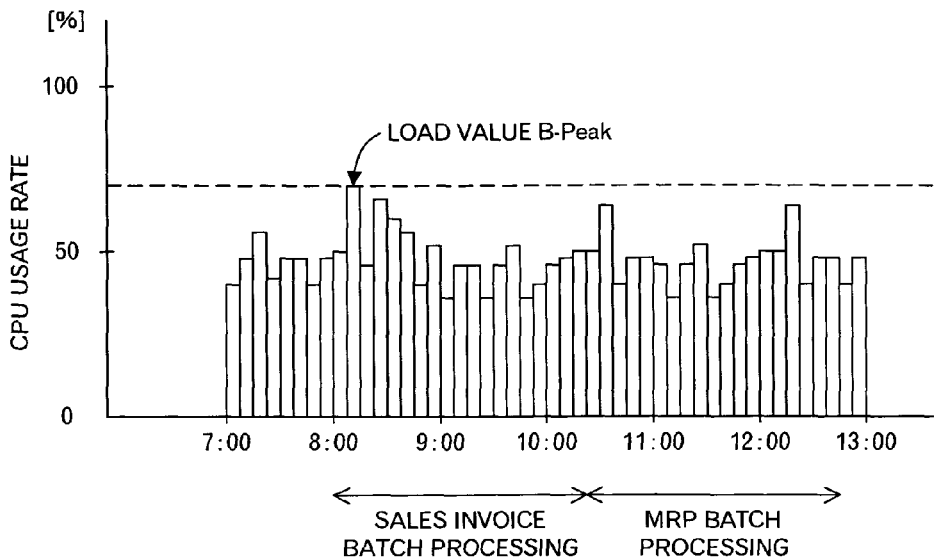
FIG. 11 is a diagram to explain data stored in an operating state data storage.

Returning to the explanation of FIG. 6, the operating state data acquirer 37 acquires the operating state data from the operating state data storage 15 of the analyzed system 1, and stores it into the operating state data storage 38 of the resource optimization apparatus 3 (step S5). For instance, the performance information (CPU usage rate and the like) for each predetermined time and the processed transaction item at that time are acquired. In a case where the performance information is the CPU usage rate, a graph as shown in FIG. 11 can be drawn by the acquired data, for example. In the example of FIG. 11, a batch processing for the sales invoices is carried out from about 8:00 to about 10:22, and a batch processing for the Material Requirement Planning (MRP) is carried out from about 10:22 to about 12:45, and the peak of the CPU usage rate from 7:00 to 13:00 is 70%, and it occurs during the batch processing for the sales invoices.

Next, the operating-state-based load value calculator 39 calculates the load value B based on the information concerning the operating state by referring to the operating state data storage 38 and the conversion table storage 41, and stores it into the load value B storage 40 (step S7). For instance, it searches the conversion table storage 41 using the system configuration (the usage, the CPU name, the model, the number of CPUs, the memory capacity, the disk capacity, and the like) of the analyzed system 1 input in advance via the user interface unit 31 as a key, and calculates a load value (B-max) from the searched record. For instance, it is assumed that 1000 was specified. Next, it extracts the CPU usage rate at the peak from the data stored in the operating state data storage 38. The B-peak (=700) is calculated by multiplying the CPU usage rate at the peak by the load value (B-max). Then, the recommended PKG load value B-req is calculated by dividing the B-peak by the ideal limit CPU usage rate (65%). In the aforementioned example, 700/0.65=1080. The B-req calculated like this is stored into the load value B storage 40 as the load value B.

Figure 12:
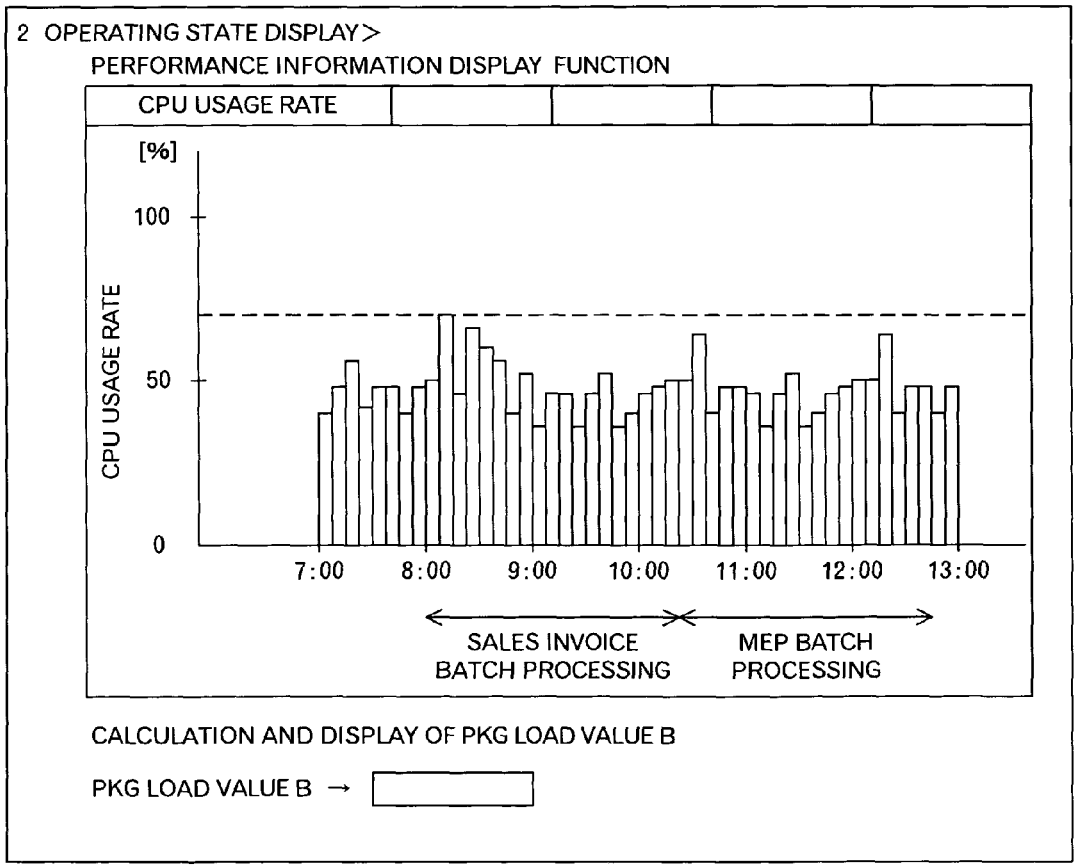
FIG. 12 is a diagram showing an example of a screen to display the operating state display.

Then, the operating-state-based load value calculator 39 displays the operating state and the load value B of the analyzed system 1 on the display device via the user interface unit 31 (step S9). For instance, the display as shown in FIG. 12 is carried out. In the example of FIG. 12, the graph shown in FIG. 11 is displayed in the performance information display function part, and the value of the PKG load value B is displayed in the calculation and display part of the PKG load value B. Thus, according to FIG. 12, it is possible to show the operating state of the analyzed system 1 and the current state of the load value B.

Next, the judging unit 42 refers to the load value B storage 40 and the load value A storage 36 to judge whether or not the difference between the load value A and the load value B is equal to or more than a predetermined amount in this embodiment (step S11). It is also possible to judge whether or not the difference but the ratio is equal to or more than a predetermined value. In addition, it is also possible to judge it based on the value calculated by a predefined equation. If it is judged that there is a difference between the load value A based on the information concerning the transaction amount and the load value B based on the operating state, which is equal to or more than the predetermined amount, a transaction amount change processing is carried out (step S13).

This transaction amount change processing will be explained by using FIGS. 13 and 14. First of all, the processed transaction item extractor 43 specifies a processed transaction item at the peak from the information concerning the operating state by referring to the operating state data storage 38 in response to the instruction of the judging unit 42, and stores it into the processed transaction item storage 44 (step S31). In such a case where the graph as shown in FIG. 11 is obtained, because there is a peak while the batch processing for the sales invoices is carried out, data of "batch processing for the sales invoices" is stored in the processed transaction item storage 44 for FIG. 11.

Moreover, the proposal value calculator 45 refers to the transaction amount data storage 33 and the replacement conversion table storage 50 in response to the instruction from the judging unit 42 to calculate the proposal value of the transaction amount (for instance, the number of cases) of the processed transaction item specified at the step S31 according to the ratio of the load value A and the load value B by using the load value A and the load value B similarly received from the judging unit 42, and stores it into the proposal value storage 46 (step S33). For instance, if the load value A:the load value B=1:1.2, for instance, a current transaction amount is 100, 100×1.2=120 is calculated as a proposal value.

Then, the transaction amount acquirer 32 refers to the transaction amount data storage 33 and the proposal value storage 46 to present the user the information concerning the former transaction amount with the proposal value of the transaction amount of the processed transaction item specified at the step S31 via the user interface unit 31 (step S35). For instance, a screen as shown in FIG. 14 is displayed. The screen example of FIG. 14 includes a display and input column of the information concerning the transaction amount, a display column of the PKG load value A, a display column of the PKG load value B, a display column of the modification proposal value, and a column of trial calculation to shift to different packages (PKG) (including a package (PKG) selection pull-down menu for the shift assumption, a display column of the proposal value when shifting to PKG1, and a display column of the proposal value when shifting to PKG2) Thus, the user inputs to modify the number of processed cases or time zone in the specific business class and specific data class while referring to the modification proposal business item and the modification proposal value in addition to the current load value A and the load value B. Because it is a proposal value, the user should not necessarily follow this. Moreover, when it is made to change from an existing business package to another business package, the business package of the shift destination is selected in the package selection pull-down menu. Incidentally, either PKG1 or PKG2 is selected here. The proposal value when shifting to PKG1 and the proposal value when shifting to PKG2 are converted by using the replacement conversion table storage 50 when shifting to different PKG, and because a load value A different from the value when the shift is not carried out is calculated, they are separately represented.

Then, the transaction amount acquirer 32 accepts the modification input from the user through the user interface unit 31, accepts the input of the business package of the shift destination according to circumstances, stores the modified information concerning the transaction amount and the data of the business package of the shift destination into the transaction amount data storage 33, and stores data of the business item to which the modification is carried out into the modified item storage 47 (step S37). Furthermore, the sizing processor 34 refers to the coefficient table storage 35 and the transaction amount data storage 33 to calculate the load value A based on the information concerning the transaction amount according to the predetermined sizing method, stores it into the load value A storage 36, and displays it on the display device through the user interface unit 31 (step S39). Incidentally, the conversion processing is carried out by referring to the replacement conversion table storage 50, when there is a shift to a different business package. In the conversion processing, the load value A after the shift is calculated by multiplying the intermediate value 2 calculated for each business item and the corresponding conversion coefficient, and totaling the multiplication results.

Figure 13:
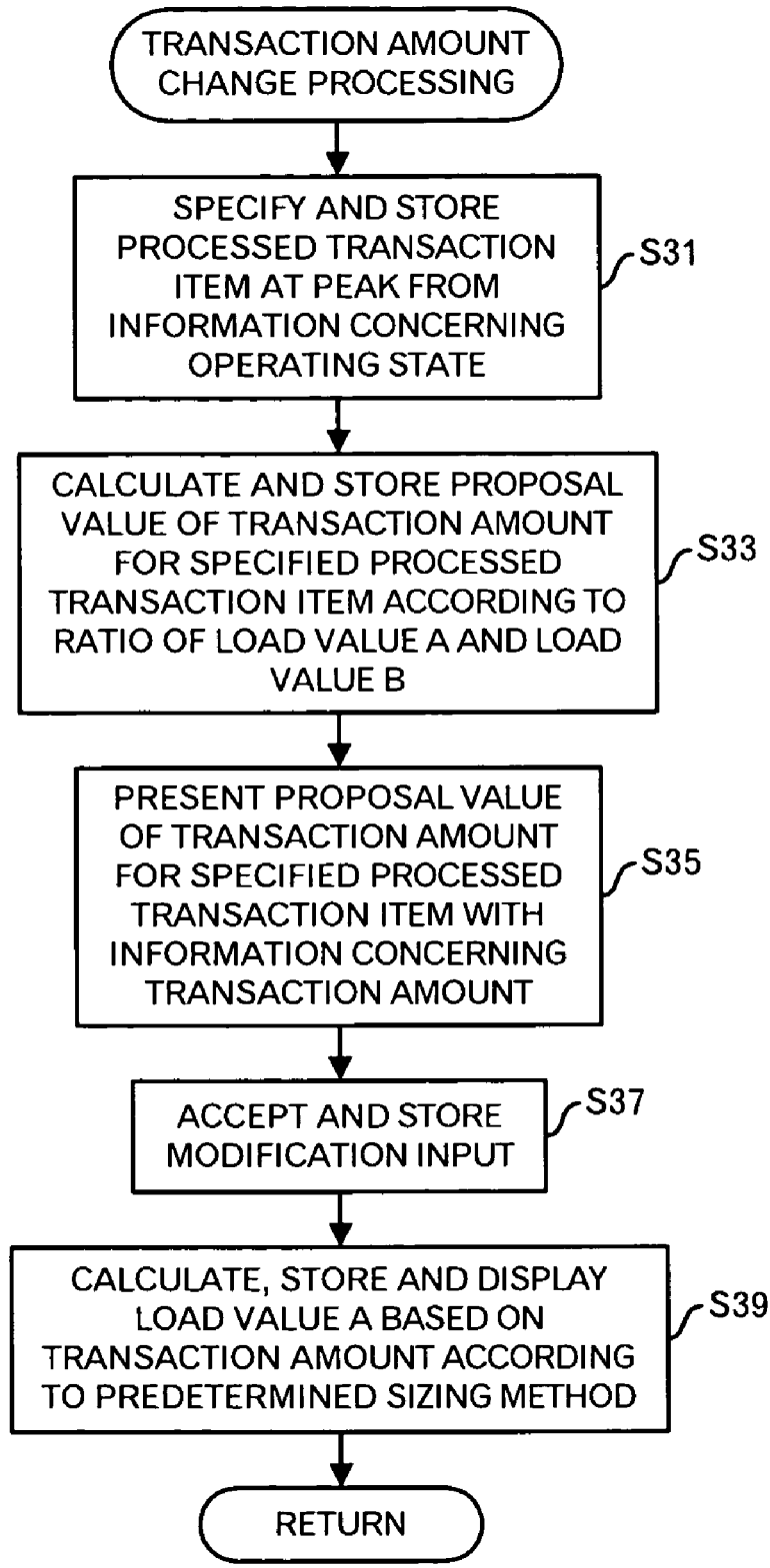
FIG. 13 is a diagram showing a processing flow of a transaction amount change processing.

Then, the processing returns to the step S11 of FIG. 6, because the change processing of the transaction amount in FIG. 13 is completed. As described above, the judging unit 42 judges whether or not the difference between the load value A and the load value B is equal to or more than the predetermined amount.

Figures 15, 16:
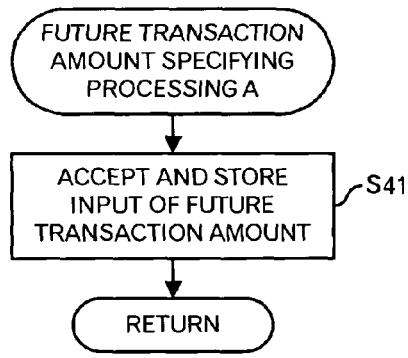
FIG. 15 is a diagram showing an example of an input screen of the information concerning the transaction amount in future.
FIG. 16 is a diagram showing a processing flow of a first processing to specify the transaction amount in future.

If it is judged that the difference between the load value A and the load value B is less than the predetermined amount, the load value A at that time is judged to be appropriate from the operating state of the analyzed system 1. Then, the judging unit 42 outputs an instruction to the future transaction amount specifying unit 48, and the future transaction amount specifying unit 48 refers to the load value A storage 36 and the transaction amount data storage 33 to present the user the load value A and the information concerning the transaction amount, which is used to calculate the load value A through the user interface unit 31 (step S15). For instance, a screen as shown in FIG. 15 is displayed. The screen example of FIG. 15 includes a column to update the basic value input entry, including an assumed value in future, a calculation and display part of the PKG load value A, and a check button. The transaction amount that was used to calculate the load value A is displayed in the column of the number of processed cases and the column of the time zone in the column to update the basic value input entry.

Then, the user considers the increase and decrease of the future transaction amount to input data in the column of the assumed value in future in the column to update the basic value input entry. That is, the future transaction amount specifying unit 48 carries out a future transaction amount specifying processing (step S17). There are two methods for this processing. In the first method, as shown in FIG. 16, it simply accepts the input of the future transaction amount, which was input to the screen as shown in FIG. 15, and stores it into the transaction amount data storage 33 (step S41). For instance, as shown in FIG. 17, the assumed value in future (the future transaction amount) is registered for the number of processed cases for one day at high load for each business class and each data class. Additionally, the time zone to have to complete the processing at high load is also registered as well as FIG. 9. Incidentally, as for the assumed value in future, values for all items need not be input. As for the item that is not input, the information concerning the transaction amount that was used to calculate the load value A is used as it is.

Figures 18, 19:
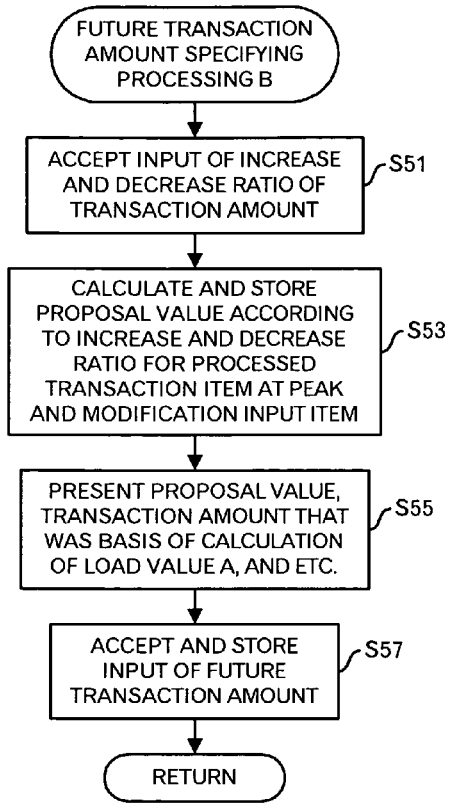
FIG. 18 is a diagram showing a processing flow of a second processing to specify the transaction amount in future.
FIG. 19 is a diagram showing an example of an input screen of the information concerning the transaction amount in future.

However, there is a case where a normal user cannot set an appropriate transaction amount in future even if he or she refers to the appropriate load value A and the information concerning the transaction amount that is the basis of the calculation of the load value A. For that case, a processing as shown in FIG. 18 is carried out. The future transaction amount specifying unit 48 displays a screen to prompt the user to input the increase and decrease ratio of the transaction amount through the user interface unit 31. For instance, an input column of the increase and decrease ratio and a proposal value calculation button are provided on the screen as shown in FIG. 15, and the future transaction amount specifying unit 48 accepts the input of the increase and decrease ratio of the transaction amount and the proposal value calculation instruction from the user, and stores the input data into a storage device such as a main memory (FIG. 18: step S51). Then, it refers to the transaction amount data storage 33 to calculate the proposal value according to the input increase and decrease ratio, for the processed transaction item at the peak, which is stored in the processed transaction item storage 44, and the modified input item stored in the modified item storage 47, and stores the proposal value into the storage device such as a main memory (step S53). Incidentally, although there is possibility in which the processed transaction items at the peak overlap with the modified input items, the processed transaction items at the peak do not overlap with the modified input items in a case where items different from the proposal are modified, because the user does not necessarily change according to the proposal. For instance, if the numerical value of 1.5 is input as the increase and decrease ratio, values of the processed transaction item at the peak and modified input item are multiplied by 1.5.

Then, it presents the user the proposal value calculated at the step S53 and the transaction amount that was used to calculate the appropriate load value A through the user interface unit 31 (step S55). For instance, a screen as shown in FIG. 19 is displayed. The screen example of FIG. 19 includes a display and input column of the information concerning the transaction amount, including a business class column, a data class column, a column of the number of processed cases, a column of the assumed value in future, and a time zone column, a display column of the appropriate PKG load value A, a display column of the input increase and decrease ratio of the transaction amount, and a display column of the proposal value draft in future. Thus, the user inputs the transaction amount in future into the column of the assumed value in future while referring to the appropriate load value A, the transaction amount that was the basis of the load value A calculation, the proposal value draft (item and numerical value) in future, and the increase and decrease ratio of the transaction amount. Incidentally, it is not necessary to input the future transaction amount for all items. The user inputs a value of the item that seems that there is a change. When the item and the numerical value are proposed like this, the user can input the numerical value that seems to be more appropriate and the like.

The future transaction amount specifying unit 48 accepts the input of the transaction amount in future from the user through the user interface unit 31, and stores it into the transaction amount data storage 33 (step S57). Incidentally, the example of data stored in the transaction amount data storage 33 is similar to FIG. 17.

Returning to the explanation of FIG. 6, the sizing processor 34 calculates the load value C based on the transaction amount in future according to the predetermined sizing method by referring to the coefficient table storage 35 and the transaction amount data storage 33, and stores it into the load value A storage 36 (step S19). For instance, the calculation as shown in FIG. 20 is carried out. FIG. 20 is a table that is enhanced from FIG. 10, and a column of the assumed value in future is added. The item value is calculated by using the assumed value in future when the numerical value is input to this column of the assumed value in future. In the example of FIG. 20, as for the number of processed cases for the sales management invoice, it is assumed that the value increases from "100" to "200", and as for the number of processed cases for the financial accounting invoice, it is assumed that the value increases from "500" to "800". Therefore, the intermediate values 1 are calculated for these items by using the values in the column of the assumed value in future, the intermediate values 2 are calculated from the intermediate values 1 calculated like this, and the total of the intermediate values 2 is calculated. Then, it is assumed that the load value C increases from "993" to "1112".

Thus, when the future load value C is calculated, the recommendation device extractor 49 specifies the system configuration from the load value C in future by referring to the conversion table storage 41, and outputs it to the user with the load value C in future through the user interface unit 31 (step S21). For instance, a screen as shown in FIG. 21 is displayed. In the example of FIG. 21, a display column of the future load value C and a display column of the recommendation configuration are added to the screen shown in FIG. 19. Although completely the same load value as the future load value C may not be registered in the conversion table storage 41, for that case, a system configuration corresponding to a load value, which is more than and closest to the load value C in future, is specified as the recommended system configuration.

The information concerning an appropriate transaction amount corresponding to the operating state can be specified by carrying out such a processing. Moreover, because it becomes possible to specify the system configuration that will be needed in future, based on the information concerning the appropriate transaction amount, it also becomes possible to carry out the estimation accurately and appropriately.

Although one embodiment of this invention has been explained above, this invention is not limited to the aforementioned embodiment. For instance, the screen examples indicated above are mere examples, and they are not necessarily limited to aforementioned configurations. Moreover, the arrangement and configuration of the functional blocks in the resource optimization apparatus 3 does not necessarily correspond to actual program modules. A part or all of the functional blocks in the resource optimization apparatus 3 may exist in the analyzed system. In addition, the resource optimization apparatus 3 may be configured by a plurality of computers.

Furthermore, necessary items for the sizing are different depending on the character of the processing executed in the analyzed system 1, for instance, customer's business conditions and the type of business. For instance, in a case of the sales retail business, items relating to the sales, that is, sales invoices and financial invoices are main factors, which increase or decrease. Moreover, in a case of manufacturing, items relating to the production management, such as items of MRP, in addition to the aforementioned elements are main factors which increase or decrease. Incidentally, there is a case in which the sizing is separately carried out, and only the result of the sizing is input to the resource optimization apparatus 3. For that case, the input load value A is stored in the load value A storage 36.

In addition, the resource optimization apparatus 3 is a computer device. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 22. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. An information processing method comprising:
   obtaining first data concerning a transaction amount presumed as being processed in a system to be analyzed for a plurality of business items;
   calculating a first load amount from said first data concerning said transaction amount;
   obtaining a Central Processing Unit (CPU) usage rate of said system to be analyzed, for each predetermined period;

identifying a load value corresponding to a system configuration of said system to be analyzed, from predefined associations between system configurations and load values;

calculating a second load amount by multiplying the identified load value by a ratio of a CPU usage rate at a peak among the obtained CPU usage rates, for a reference CPU usage rate;

determining whether or not a difference between said first load amount and said second load amount is equal to or greater than a predetermined amount;

once said difference between said first and second load amounts is equal to or greater than said predetermined amount in said judging, prompting a user to modify said first data concerning said transaction amount, and accepting data modified by said user; and executing said calculating said first load amount and said judging by using said accepted data.

2. The information processing method as set forth in claim 1, further comprising:

once said difference between said first and second load amounts is less than said predetermined amount in said judging, prompting said user to input third data concerning a future transaction amount for at least a part of said plurality of business items; and calculating a first load amount in future by using said third data concerning said future transaction amount.

3. The information processing method as set forth in claim 2, further comprising:

referring to a table associating a load amount with a computer configuration to specify a computer configuration from said first load amount in future, and presenting the specified computer configuration to said user.

4. The information processing method as set forth in claim 2, further comprising:

once said difference between said first and second load amounts is equal to or greater than said predetermined amount in said judging, specifying a business item to be modified, based on said second data;

presenting a user said business item to be modified to prompt said user to modify said first data concerning said transaction amount, and accepting the modified data from said user; and executing said calculating said first load amount and said judging by using said modified data, and wherein said calculating a first load amount in future comprises:

accepting an input of fourth data concerning a change ratio of said transaction amount from said user; and calculating a proposal value based on said fourth data concerning said change ratio for at least either of said business item to be modified and a business item relating to said modified data to present said user the calculated proposal value.

5. An information processing method comprising:

obtaining a first load amount calculated based on first data concerning a transaction amount presumed to be processed in a system to be analyzed;

obtaining a Central Processing Unit (CPU) usage rate of said system to be analyzed, for each predetermined period;

identifying a load value corresponding to a system configuration of said system to be analyzed, from predefined associations between system configurations and load values;

calculating a second load amount by multiplying the identified load value by a ratio of a CPU usage rate at a peak among the obtained CPU usage rates, for a reference CPU usage rate; and judging whether or not a difference between said first load amount and said second load amount is equal to or greater than a predetermined amount for judging appropriateness of said first data.

6. The information processing method as set forth in claim 5, further comprising:

once said difference between said first and second load amounts is equal to or greater than in said judging, specifying a business item to be modified, based on said second data.

7. The information processing method as set forth in claim 6, further comprising:

referring to said first data concerning said transaction amount, said first load amount, and said second load amount to calculate a proposal value for the specified business item to be modified.

8. The information processing method as set forth in claim 6, wherein, in said specifying, a business item at a timing upon a resource usage rate becoming maximum is specified by using said second data.

9. The information processing method as set forth in claim 7, wherein said first data concerning said transaction amount includes data of a number of processed invoices and a processing time zone, and said proposal value is a value for the number of processed invoices.

10. The information processing method as set forth in claim 5, further comprising:

referring to a conversion coefficient data storage registering a coefficient to convert a value in a first business package into a value in a second business package, and converting said first load amount to a load amount in a designated business package.

11. A program stored on a non-transitory computer readable medium, for causing a computer to execute an information processing, said program comprising:

obtaining first data concerning a transaction amount presumed as being processed in a system to be analyzed for a plurality of business items;

calculating a first load amount from said first data concerning said transaction amount;

obtaining a Central Processing Unit (CPU) usage rate of said system to be analyzed, for each predetermined period;

identifying a load value corresponding to a system configuration of said system to be analyzed, from predefined associations between system configurations and load values;

calculating a second load amount by multiplying the identified load value by a ratio of a CPU usage rate at a peak among the obtained CPU usage rates, for a reference CPU usage rate;

determining whether or not a difference between said first load amount and said second load amount is equal to or greater than a predetermined amount;

once said difference between said first and second load amounts is equal to or greater than said predetermined amount in said judging, prompting a user to modify said first data concerning said transaction amount, and accepting data modified by said user; and executing said calculating said first load amount and said judging by using said accepted data.

12. A program stored on a non-transitory computer readable medium, for causing a computer to execute an information processing, said program comprising:
- obtaining a first load amount calculated based on first data concerning a transaction amount presumed to be processed in a system to be analyzed;
- obtaining a Central Processing Unit (CPU) usage rate of said system to be analyzed, for each predetermined period;
- identifying a load value corresponding to a system configuration of said system to be analyzed, from predefined associations between system configurations and load values;
- calculating a second load amount by multiplying the identified load value by a ratio of a CPU usage rate at a peak among the obtained CPU usage rates, for a reference CPU usage rate; and
- judging whether or not a difference between said first load amount and said second load amount is equal to or greater than a predetermined amount for judging appropriateness of said first data.

13. A computer, comprising:
- a unit to obtain first data concerning a transaction amount presumed as being processed in a system to be analyzed for a plurality of business items, wherein said first data includes, for each of said plurality of business items, a number of cases;
- a first calculation unit to calculate a first load amount from said first data concerning said transaction amount;
- a unit to obtain a Central Processing Unit (CPU) usage rate of said system to be analyzed, for each predetermined period;
- a unit to identify a load value corresponding to a system configuration of said system to be analyzed, from predefined associations between system configurations and load values;
- a unit to calculate a second load amount by multiplying the identified load value by a ratio of a CPU usage rate at a peak among the obtained CPU usage rates, for a reference CPU usage rate;
- a judging unit to determine whether or not a difference between said first load amount and said second load amount is equal to or greater than a predetermined amount; and
- a unit to prompt a user to modify said first data concerning said transaction amount, and accept data modified by said user, once said difference between said first and second load amounts is equal to or greater than said predetermined amount; and
- wherein said first calculation unit and said judging unit operate by using said accepted data.

14. A computer, comprising:
- a unit to obtain a first load amount calculated based on first data concerning a transaction amount presumed to be processed in a system to be analyzed;
- a unit to obtain a Central Processing Unit (CPU) usage rate of said system to be analyzed, for each predetermined period;
- a unit to identify a load value corresponding to a system configuration of said system to be analyzed, from predefined associations between system configurations and load values;
- a unit to calculate a second load amount by multiplying the identified load value by a ratio of a CPU usage rate at a peak among the obtained CPU usage rates, for a reference CPU usage rate; and
- a unit to judge whether or not a difference between said first load amount and said second load amount is equal to or greater than a predetermined amount for judging appropriateness of said first data.

15. An information processing method as set forth in claim 1, wherein said first transaction amount is calculated by calculating, for each of said plurality of business items, a product of the number of cases for the corresponding business item and a corresponding coefficient.

* * * * *